United States Patent [19]

Ferrara, Jr.

[11] Patent Number: 5,323,973
[45] Date of Patent: Jun. 28, 1994

[54] KITCHEN BLENDER
[76] Inventor: Daniel A. Ferrara, Jr., Looking Glass Hill Rd., Bantam, Conn. 06750
[21] Appl. No.: 48,520
[22] Filed: Apr. 20, 1993
[51] Int. Cl.$^5$ .............................................. B02C 18/08
[52] U.S. Cl. .................................. 241/37.5; 241/100; 241/199.12
[58] Field of Search .............. 241/37.5, 100, 199.12, 241/46.01; D7/378

[56]  References Cited
U.S. PATENT DOCUMENTS

| | | | |
|---|---|---|---|
| D. 191,152 | 8/1961 | Rawson, Jr. et al. | D7/378 |
| D. 218,583 | 9/1970 | Gilson | D7/378 |
| 2,284,155 | 5/1942 | Landgraf | 241/199.12 |
| 2,758,623 | 8/1956 | Malz et al. | 241/199.12 |
| 3,791,597 | 2/1974 | Walter et al. | 241/100 |
| 3,837,587 | 9/1974 | Walter et al. | 241/100 |
| 4,111,372 | 9/1978 | Hicks et al. | 241/37.5 |

Primary Examiner—Mark Rosenbaum
Assistant Examiner—John M. Husar
Attorney, Agent, or Firm—Dallett Hoopes

[57] ABSTRACT

A blender has a container shaped in an oblong cross-section with the opposite ends of semi-circular shape and parallel straight walls inbetween these ends. The rotary cutter is positioned at the center at one of the semi-circular ends giving the container an off-center heavier side. The power base on which the container sits provides a telescoping tower to house an electrical interlock safety switch at its upper end which is engaged by an element on the container cover so that only when the cover is fully on the container can the blender be activated.

15 Claims, 2 Drawing Sheets

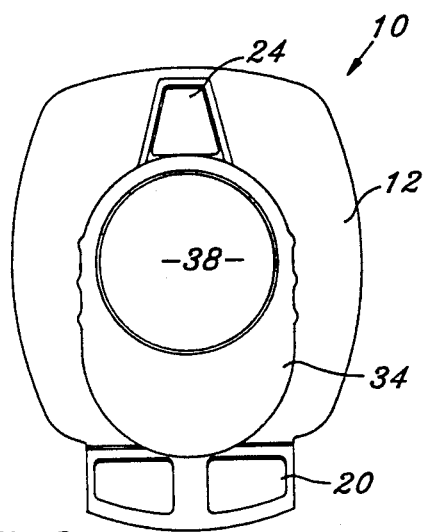
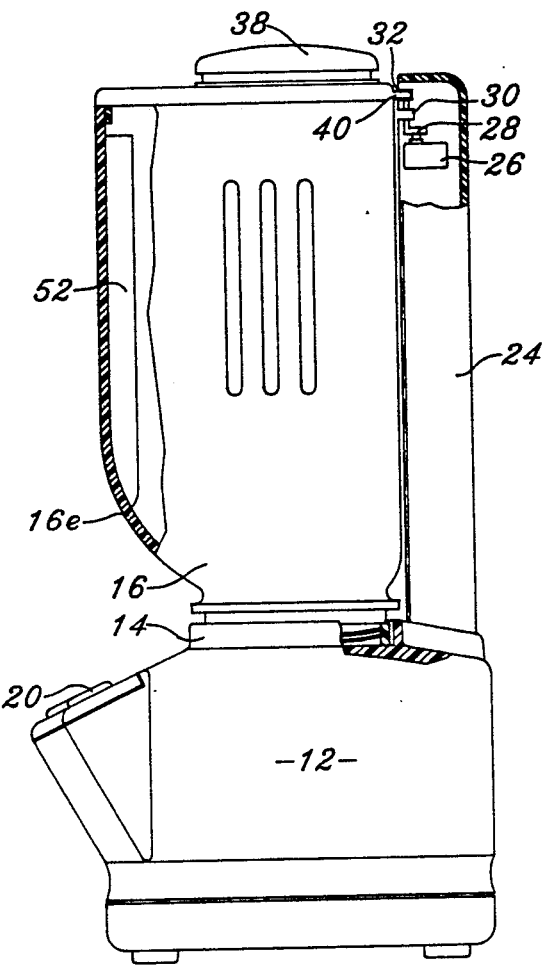
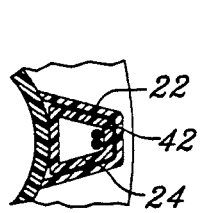
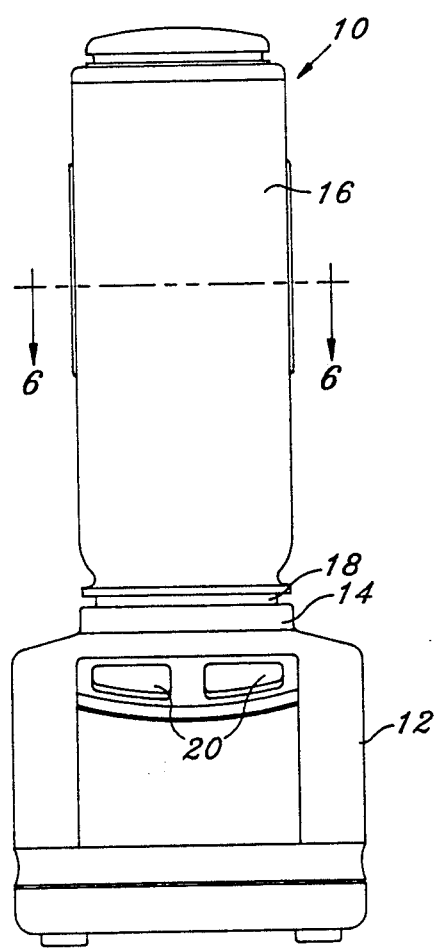
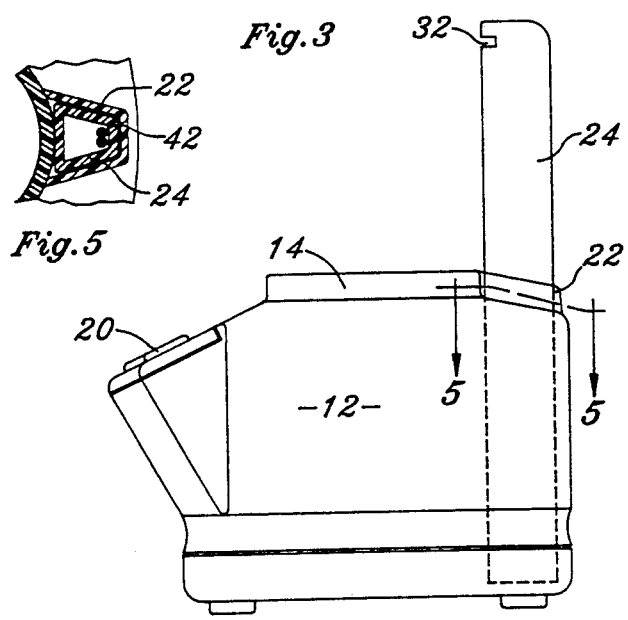

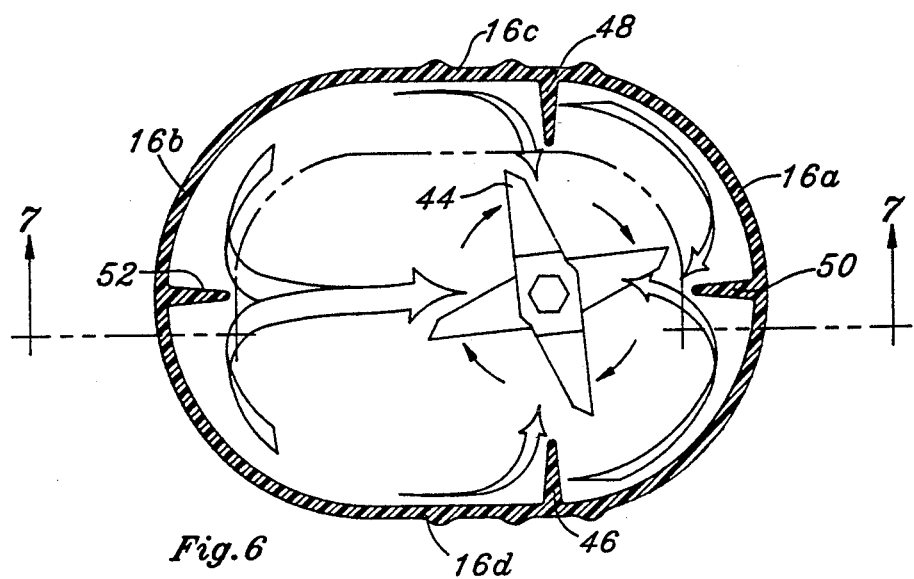
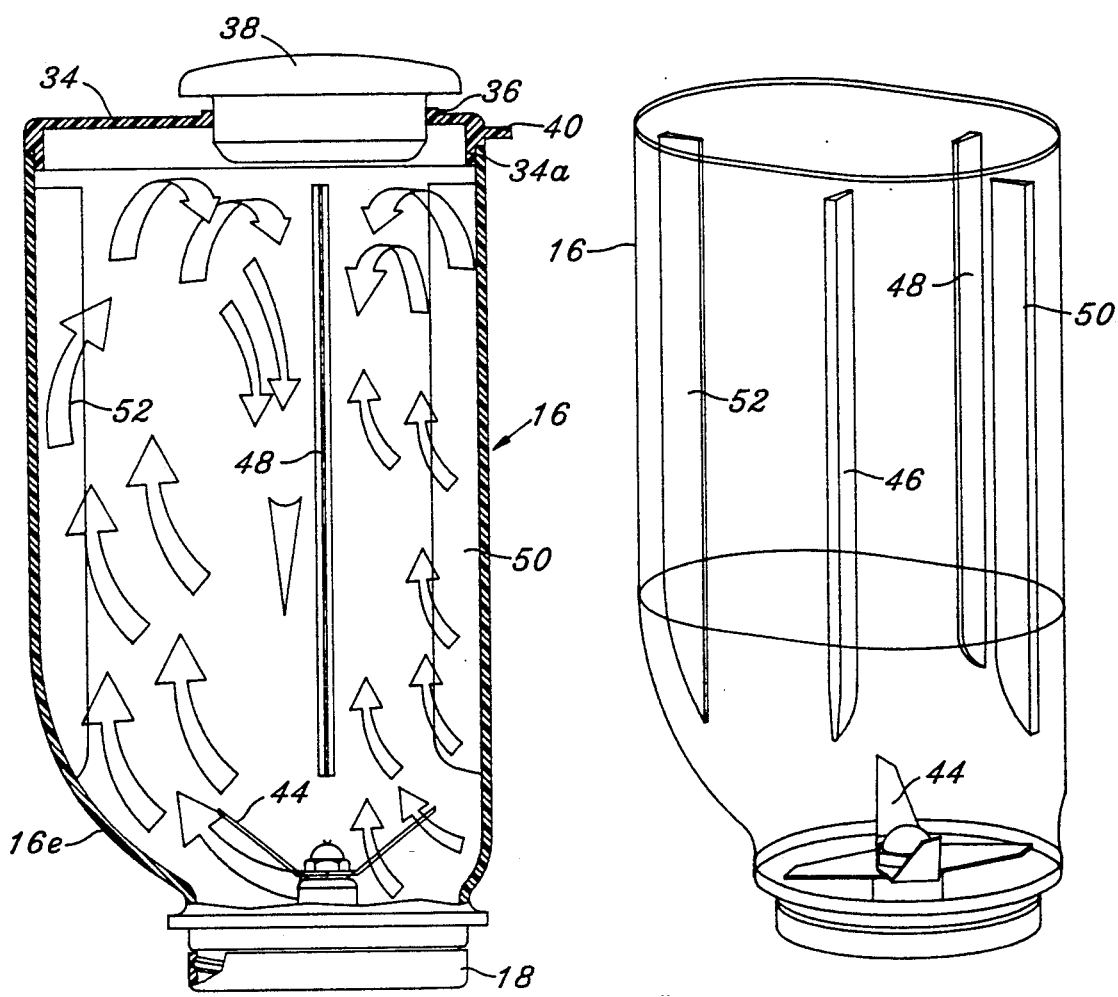

KITCHEN BLENDER

BACKGROUND OF THE INVENTION

1. Field of the Invention

This invention relates to kitchen blenders. More specifically, the invention relates to blenders in which a container having a rotary cutter in its bottom wall normally sits on a power base, a motor in the power base being releaseably coupled to the cutter.

2. Description of Related Art including Information Disclosed under §§1.97 to 1.99

The prior art is loaded with examples of kitchen blenders comprising containers which sit on a power base with automatically engaged coupling means on the bottom of the container and top of the base. Examples are Pat. No. 2,284,155 which issued May 26, 1942 to M. J. Landgraf; Pat. No. 2,758,623 which issued Aug. 14, 1962 to N. Malz et al; and Pat. No. 3,175,594 which issued Mar. 30, 1965 to I. Jepson et al. In the past the containers for such blenders have been more or less symmetrical about the axis of the cutter.

Some of the containers have featured longitudinal inward fins or vanes which assist in the blending process. For instance, in the Landgraf patent, the cutter swirls the fluid within the container in a general rotary direction past the fins which deflect the fluid inward and upward or downward to assist in the blending operation. This phenomenon is generally treated in the Landgraf patent.

The prior art has, as well, disclosed a number of food processors wherein, for safety, the motor has been disabled until the cover is in place. This avoids the risk of injury by someone reaching down into the container while the cutter is rotating. Such devices, for instance as that shown shown in the U.S. Pat. No. 4,184,641 which issued Jan. 22, 1980 to M. Coggiolia, have involved a lateral tab on the container cover which causes actuation of an interlock switch only when the cover is in place. The interlock switch is normally at the level of the cover.

Generally, such interlock switch means have not been used on blenders because the distance between the top of the container and the cutter has been great enough so that accidental insertion of one's hand all the way to the cutter has not been likely.

SUMMARY OF THE INVENTION

It is the purpose of the present invention to optimize the blending of material in the container. For this optimized blending the container is shaped in an oblong cross section with the opposite ends of semi-circular shape and parallel straight walls inbetween these ends. Inward fins are provided. Further, the conventional cutter or rotary driver is positioned at the center at one of the semi-circular ends. Because the body of fluid in the blender of the invention is thus lop-sided with respect to the axis of the cutter, the body of fluid does not simply rotate with the cutter as in the prior art blenders. The arrangement of the invention further enhances the blending action because each particle of fluid within the blender is not only rotated and vigorously changed in direction as it impacts the fins, but it is also thrown outward along the respective straight wall sections and falls back down.

The blender of the invention includes the container which is, of course, of unique design, and a tower alongside the container to support at its upper end an interlock safety switch which cooperates with the container.

BRIEF DESCRIPTION OF THE DRAWINGS

Further objects and features of the invention will be apparent to those skilled in the art from a reading of the following specification and a study of the accompanying drawings, all of which disclose a non-limiting embodiment of the invention. In the drawings:

FIG. 1 is a front elevational view of a blender embodying the invention;

FIG. 2 is a top plan view;

FIG. 3 is a side elevational view;

FIG. 4 is a side elevational view with the container removed and showing the tower telescoped into the base;

FIG. 5 is a fragmentary sectional view taken on the line 5—5 of FIG. 4;

FIG. 6 is an enlarged sectional view taken on the line 6—6 of FIG. 1;

FIG. 7 is a sectional view taken on the line 7—7 of FIG. 6; and

FIG. 8 is a partly schematic simplified three-dimensional view of the container taken from the front and left side and showing with arrows some portrayal of the actual flow inside the container as the cutter rotates.

DESCRIPTION OF THE PREFERRED EMBODIMENT

A blender embodying the invention is generally designated 10 in FIG. 1. It comprises a base 12 having a motor with an upwardly facing coupling part (not shown) in the center of a support collar 14, and a container 16 having a bottom peripheral wall and cap 18 which is threaded onto the lower end of the container and fits into collar 14. The height of the container is at least twice the width f its lower end.

In the center of the cap is a bushing journaling a shaft (not shown) having a downward second coupling part (not shown). The coupling parts automatically interengage when the container sits on the base.

Controls 20 are provided for the motor in the base 12.

The base is provided with a tubular opening 22 which receives in telescoping fashion a tower 24. By virtue of this construction, the tower 24 can be extended all the way up (FIG. 3) to the level of the cover of the container or can be retracted down into the base (FIG. 4) so that with the container removed, the blender can be more readily stored.

Mounted inside the upper end of the tower 24 by means (not shown) is an interlock safety switch 26 which may be activated by an L-shaped member 28 vertically slideable in a U-shaped holder 30 mounted against a wall of the tower more adjacent the container 16. The same inside wall of the tower 24 is horizontally slotted as at 32.

The container 16 is provided with a cover 34 (FIG. 7) formed with a downward inwardly offset vertical wall 34a which fits inside the mouth of the container when the cover is closed. The cover 34 is provided with a circular opening 36 which receives a plug 38. The plug may be removed during the blending process to add ingredients if desired or necessary.

The cover is also formed with a generally horizontal outward operating tab 40 molded integrally with the cover.

By virtue of the structure disclosed, when the container 16 with its cover on is set in position on the collar 14 and turned into the position shown, the tab 40 fits into the slot 32. The tab 40 drives down the L-shaped member 28 to depress the actuator of the switch 26. When the switch 26 closes its circuit through the wires 42 (FIG. 5) the motor within the base 12 may be activated by controls 20.

A cutter 44 is disposed on the upper end of the shaft in the bushing in the bottom cap 18 as described. It will be noted that the container 16 from a position above the cutter 44 is offset, that is to say, in FIG. 6 the left-hand side of the container extends out well beyond the right-hand side with repsect to the axis of the cutter, giving the container a heavy side.

As shown best in FIG. 6, the container in the level of the section line 6—6 comprises a semi-circular proximate side wall 16a and a semi-circular remote side wall 16b, the two curved wall sections being joined by parallel flat side walls 16c and 16d. The axis of the cutter 44 and the bottom cap 18 is disposed coaxial with the curved side wall 16a. Thus, to meet the bottom cap 18, the remote sidewall 16b is formed at its lower end with an inwardly declining belly 16e (FIG. 7).

The fins which taper toward their distal edge are disposed every 90° within the container and thus are disposed as at 46 and 48 where the curved side wall 16a meets the flat side walls 16c and 16d and as at 50 midway around the wall between the fins 46 and 48. An additional fin 52 is formed at the midpoint of the remote end wall 16b.

Generally, the major flow in the container is as follows. At the lower end of the chamber the liquid spins off the cutter under the fins, contacts the fins and goes up along the fins and at the top moves inward to the axis of the cutter and back down to the bottom. This general circulating, of course, induces secondary counter flow in the form of back flows, eddies, etc.

Because of the many contra-moving contiguous layers of liquid in the container, there are produced conditions of high shear. These conditions are especially effective in the blending and mixing of ingredients, dry or liquid, and in reducing particle size of solids. It will be clear that in the container contiguous layers of liquid will be moving at different speeds. For instance, because of centrifugal force, the liquid between fins 46 and 52 will be moving linearly at a high rate along the straight section 16d of the wall. Slower layers will be nearby.

As can be imagined, the directions of flow of liquid at any point in the container can only be approximated in any diagram in the most general way. What can be said with certainty is that a particle of liquid experiences many abrupt changes in direction and is influenced by the straight wall sections 16c and 16d in a way which would not be true if the container were merely circular or symmetrical as the containers of the prior art. Further, having the inward fins and the cutter offcenter and, at the same time, coaxial with a section of the wall 16a will enhance the variety of different directions and speeds to which a given particle is subject.

Because of the asymmetrical shape of the container, the material cannot rotate with the blade as in present blenders. Also, in prior blenders the material stratifies, the outside moves slowly, goes up and returns down the center. The present blender violently moves the material at high speed and blends with much less power and eliminates cavitation. The overall result is thus a better blending than in a symmetrical container in the prior art. Moreover, the present blender eliminates cavitation and the rotating stratified layers turning with the cutter as has characterized blenders of the prior art.

It should be understood that the invention is not limited to the embodiments shown but the invention is instead defined by the scope of the following claim language, expanded by an extension of the right to exclude as is appropriate under the doctrine of equivalents.

What is claimed is:

1. A kitchen blender comprising:
   a. a blender base enclosing an electric motor and having an upwardly facing coupling part operatively connected with the motor,
   b. a blender container having a height at least twice the width of its lower end and being removably supported on the base and having a vertical side wall portion, a cover at the upper end of the container and a cutter journaled in the lower end and a shaft on the cutter extending downward through the lower end of the container and terminating in a downward coupling part, the downward part operatively engaging the upwardly facing coupling part on the base.
   c. a telescoping switch housing extending upward from the base and having a vertical wall closely adjacent the vertical sidewall portion of the container and selectively extending to a height on a level with the top of the container;
   d. an electric safety switch in the housing, the switch being electrically associated with the motor,
   e. switch-affecting means on the upper end of the container cover
   whereby when the cover is on the container, the container and cover can be positioned so that the switch-affecting means affects the switch to enable the motor to be activated.

2. A blender container comprising:
   a. a horizontal floor,
   b. a journal in the floor, the journal having a vertical axis,
   c. a rotary cutter having a shaft sealingly and rotatably extending through the journal, having a cutter blade extending out from the upper end of the shaft and a coupling part at the lower end of the shaft adapted to be engaged by a cooperant driven coupling part on a blender base,
   d. a side wall extending upward about the periphery of the floor, the side wall being asymmetrical about the axis and for part of its height having a compound shape comprising three components:
      1) a first semi-cylindrical wall of uniform radius about the axis of the journal being disposed vertically and having vertical edges,
      2) a second semi-cylindrical wall of the same uniform radius and being disposed vertically about a second axis spaced from and parallel to the axis of the journal and having vertical edges, the respective vertical edges of the two semi-cylindrical walls being parallel and mutually aligned, and
      3) two parallel side wall sections joining the respective edges of the two semi-cylindrical walls.

3. A blender container as claimed in claim 2 wherein the floor is removably secured to the side wall.

4. A blender container as claimed in claim 3 wherein the floor is sealingly surrounded by a threaded collar and the lower end of the side wall is threaded and threadedly engages the collar.

5. A blender container as claimed in claim 2 wherein the side wall is formed with an outwardly convex belly between the floor and said second semi-cylindrical wall to make a smooth transition between the floor and said part of the height of the side wall.

6. A blender container as claimed in claim 2 wherein radially inward vanes are formed on the inside of the side wall.

7. A blender container as claimed in claim 6 wherein the vanes extend along the inside of the side wall for a substantial portion of the height of the side wall.

8. A blender container as claimed in claim 6 wherein the vanes are located along the junctures of the parallel side wall sections and the first semi-cylindrical wall.

9. A blender container as claimed in claim 6 wherein the vanes are located along the midpoint of the first and second semi-cylindrical walls.

10. A blender container as claimed in claim 6 wherein the vanes are located along the junctures of the parallel side wall sections and the first semi-circular wall and along the midpoint of the first and second semi-cylindrical walls.

11. A kitchen blender comprising:
   a. a blender base enclosing an electric motor and having an upwardly facing coupling part operatively connected with the motor, the base being formed with an upwardly facing opening spaced from the coupling part,
   b. a blender container supported on the base and having a cutter journaled therein and a shaft on the cutter extending downward through the lower end of the container and terminating in a downward coupling part, the downward part operatively engaging the upwardly facing coupling part on the base,
   c. a tubular tower telescopically received into the opening in the base and containing a safety switch associated with the motor,
   d. a container cover covering the upper end of the container and having a lateral leg adapted when the container is in operative position on the base and the cover is on the container to affect the switch to permit the motor to be activated and whereby when the container and cover are removed from the base, the tower can be telescoped at least partly into the base to facilitate storage.

12. A kitchen blender as claimed in claim 11 wherein the container has a side wall which is shaped unsymmetrically about the axis of the cutter shaft.

13. A kitchen blender as claimed in claim 11 wherein the blender container comprises:
   a. a horizontal floor rotatably supporting the cutter,
   b. a side wall extending upward about the periphery of the floor, the side wall being asymmetric about the axis and for part of its height having a compound shape comprising three components:
      1) a first semi-cylindrical wall of uniform radius about the axis of the cutter and having vertical edges,
      2) a second semi-cylindrical wall of the same uniform radius about a second axis spaced from and parallel to the axis of the cutter and having vertical edges, the respective vertical edges of the two semi-cylindrical walls being parallel and mutually aligned, and
      3) two parallel side wall sections joining the respective edges of the two semi-cylindrical walls.

14. A kitchen blender comprising:
   a. a blender base enclosing an electric motor and having an upwardly facing coupling part operatively connected with the motor,
   b. an open-topped blender container having a removable cover at its upper end, the container being removably supported on the base and comprising:
      1) a horizontal floor,
      2) a journal in the floor, the journal having a vertical axis,
      3) a rotary cutter having a shaft sealingly and rotatably extending through the journal, having a cutter blade extending out from the upper end of the shaft and a coupling part at the lower end of the shaft releasably engaging the coupling part on the blender base,
      4) a side wall extending upward about the periphery of the floor, the side wall being asymmetrical about the axis and for part of its height having a compound shape comprising three components:
         1) a first semi-cylindrical wall of uniform radius about the axis of the journal and being disposed vertically and having vertical edges,
         2) a second semi-cylindrical wall of the same uniform radius about a second axis spaced from and parallel to the axis of the journal and being disposed vertically and having vertical edges, the respective vertical edges of the two semi-cylindrical walls being parallel and mutually aligned, and
         3) two parallel vertically disposed side wall sections joining the respective edges of the two semi-cylindrical walls,
   c. a switch housing extending upward from the base and having a vertical wall closely adjacent said first semi-cylindrical wall,
   d. an electric safety switch in the housing, the switch being electrically associated with the motor,
   e. switch-affecting means on the cover,
      whereby when the cover is on the container, the container and cover can be positioned so that the switch-affecting means affects the switch to enable the motor to be activated.

15. A kitchen blender as claimed in claim 14 wherein inward vertical vanes are disposed along the junctures of the parallel side wall sections and the first semi-circular wall and along the midpoint of the first and second semi-cylindrical walls.

* * * * *